United States Patent Office 3,801,522
Patented Apr. 2, 1974

3,801,522
COATING COMPOSITION OF A SILICONE FLUID, A SILICONE RESIN AND A ZIRCONIUM SILICATE HARDENING AGENT
Joseph A. Vasta, Woodbury, N.J., assignor to E. I. du Pont de Nemours and Company, Wilmington, Del.
No Drawing. Filed Dec. 17, 1971, Ser. No. 209,409
Int. Cl. C08g 47/02, 51/26, 51/74
U.S. Cl. 260—29.1 R          7 Claims

ABSTRACT OF THE DISCLOSURE

The coating composition comprises a binder of
(1) 0.5–20% by weight of a dimethyl polysiloxane fluid; and correspondingly,
(2) 99.5–80% by weight of a heat curable structure polysiloxane resin having the repeating structural formula

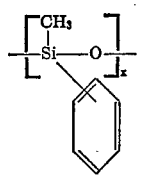

and a finely divided inorganic hardening agent, such as zirconium silicate, zirconium oxide or silicone dioxide or mixtures thereof; optionally heat stable pigments, filler pigments and reinforcing pigments, such as aluminum flake, potassium titanate fibrils, and the like can be added;
the novel composition forms finishes that have excellent release and hardness properties, excellent adhesion to unprimed metal substrates and excellent abrasion resistance, and are used as finishes for cooking vessels, such as fry pans and bakeware.

BACKGROUND OF THE INVENTION

This invention is directed to a coating composition that is useful as a finish for cooking vessels because of its excellent thermal stability, release properties, hardness and abrasion resistance.

Cookware and bakeware items have been coated with fluorocarbon polymers, such as polytetrafluoroethylene and copolymers thereof. Finishes of polytetrafluoroethylene have excellent thermal stability and good release properties and have been widely used and well accepted. A primer is generally required for these coatings, along with special treatment of the metal substrate to obtain excellent adhesion of the coating. Also, these fluorocarbon polymer coatings are readily scratched and abraded. Therefore, it would be desirable to have a coating composition that could be applied to unprimed metal substrates and would form a finish that has excellent release properties and also good abrasion and scratch resistance.

The novel coating composition of this invention does not require the use of a fluorocarbon polymer but utilizes a combination of polysilicone resins and a hardening agent, such as zirconium silicate, to form a finish that can be applied directly to the metal without the use of a primer. The novel composition forms a finish that has excellent release properties, outstanding adhesion to unprimed metal, excellent thermal stability, good hardness and abrasion resistance and is an ideal coating composition for cooking vessels, particularly fry pans, bakeware and commercial food processing equipment.

SUMMARY OF THE INVENTION

The novel coating composition has a solids content of 25–80% by weight in an inert organic liquid carrier and the solids comprise a binder consisting essentially of
(1) 0.5–20% by weight, based on the weight of the binder of dimethyl polysiloxane fluid having a viscosity of 0.65–10×10⁶ centistokes measured at 25° C.; and correspondingly,
(2) 99.5–80% by weight, based on the weight of the binder, of a heat curable structured polysiloxane resin having the repeating structural formula

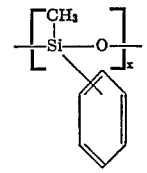

wherein x is a positive integer sufficiently large to provide a viscosity of 10–80 centistokes measured at 60% resin solids in toluene at 25° C. and the resin has a refractive index of 1.45–1.57 and a specific gravity of about 1.05–1.5;
a finely divided inert inorganic hardening agent that is either zirconium silicate, zirconium oxide, silicon dioxide or mixtures thereof, and having a hardening agent to binder ratio of about 25/100–400/100.

A metal cooking vessel coated with the above composition is also a part of this invention.

DESCRIPTION OF THE INVENTION

The novel coating composition of this invention preferably has a relatively high solids content of about 40–70% by weight and the film-forming binder constituents are dissolved in organic solvents such as toluene, xylene, tetrahydrofuran, butyl carbitol, ethylene glycol monoethyl ether, ethylene glycol monobutyl ether, and the like.

The binder of the novel coating composition of this invention is a blend of a dimethyl polysiloxane fluid and a heat curable structure of polysiloxane resin. The composition contains about 0.5–20% by weight of a dimethyl polysiloxane fluid, and correspondingly, 99.5–80% by weight of the structured polysiloxane resin. Preferably, the binder consists essentially of 5–15% by weight of the dimethyl polysiloxane fluid and correspondingly, 95–85% by weight of the structured polysiloxane resin. The combination of these two resins provide a coating composition that has excellent adhesion to unprimed metal substrates in combination with good release properties and excellent thermal stability.

The dimethyl polysiloxane fluid utilized in the novel coating composition of this invention has a viscosity of 0.65–10×10⁶ centistokes measured at 25° C. but preferably, has a viscosity of 50–1000 centistokes and to form particularly high compositions, a viscosity of 100–300 centistokes is preferred.

The heat curable structural polysiloxane resin has the repeating structural formula

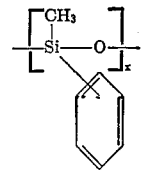

wherein x is a positive integer sufficiently large to provide a viscosity of 10–80 centistokes measured at 60% resin solids in toluene at 25° C. Preferably, to form a high quality composition, the resin has a viscosity of 20–60 centistokes. Also, the resin has a refractive index of 1.45–1.57 and a specific gravity of about 1.05–1.5 but preferably about 1.3.

To provide the composition with scratch resistance, abrasion, resistance and hardness, finely divided inert inorganic hardening agent is added in a ratio of hardening agent to binder of about 25/100 to about 400/100 and preferably a ratio of 100/100 to about 150/100 is used. The hardening agents that can be used are: zirconium silicate, zirconium oxide, silicon dioxide and mixtures thereof. The preferred hardening agent is zirconium silicate having a particle size of about 0.2–0.5 microns. However, the commercially available zirconium silicate contains small amounts of zirconium oxide and silicone dioxide and this blend can be used in this invention.

Optionally, heat stable pigments and filler pigments in a pigment to binder ratio of 5/100 and 100/100 can be utilized in the novel coating composition of this invention. Typical pigments that can be used are, for example, carbon black, titanium dioxide, brown, black, and yellow iron oxides, aluminum silicate, mica, talc, china clay, metal powders, carbonates, and the like.

Reinforcing pigment such as aluminum flake, potassium titanate fibrils, titanium dioxide fibrils, silicone dioxide fibrils, alumina monohydrate fibrils and mixtures thereof can be added to the novel coating composition of this invention in a pigment to binder ratio of about 5/100 to about 20/100. These reinforcing pigments provide a finish with improved hardness and abrasion resistance which is desirable in cookware, such as fry pans. Preferred reinforcing pigments are aluminum flake and potassium titanate fibrils.

The combination of the hardening agent, the fillers, the pigments and reinforcing pigments should not exceed a pigment to binder ratio of 400/100 to insure wetting of the pigments and good film formation.

In the preparation of the novel coating composition of this invention, the hardening agent, filler pigments, pigments and reinforcing pigments are formed into a mill base by blending these constituents with a solvent and a polysiloxane resin and then grinding the mixture by conventional techniques such as pebble mill grinding, ball mill grinding, sand mill grinding and the like. The mill base is then blended with the dimethyl polysiloxane fluid and the polysiloxane resin to form the coating composition.

The novel composition of this invention is applied to the interior of a vessel by first roughening the interior surface of the vessel preferably by grit blasting the surface with sand or the surface can be roughened by other techniques. The surface is then cleaned. Optionally, a glass frit layer can be applied to the surface of the vessel and is then baked at about 475–750° C. for about 0.5–5 minutes to coalesce the glass particles. A primer composition then can be applied to the glass frit layer or if the glass frit layer is omitted, the primer composition can be applied directly to the roughened metal substrate. The primer is then air dried and the novel coating composition of this invention is then applied by conventional techniques such as spraying, electrostatic spraying, roller coating, and the like to primed surface of the vessel and then is baked for about 5–45 minutes at about 200–400° C. The primer composition and the glass frit layer can be omitted and the novel composition of this invention can be applied directly to the roughened metal substrate of the vessel and then baked to form a finish that has excellent adhesion to the metal substrate.

One particularly useful primer composition which can be used to coat the substrate consists essentially of a dispersion of polytetrafluoroethylene, lithium polysilicate dispersed in a liquid carrier such as water. The preferred lithium polysilicate is an aqueous liquid polysilicate which contains about 15–35% by weight of silica as $SiO_2$ that has an $SiO_2/Li_2O$ molar ratio of about 4–25/1 and is free of alkali metals other than lithium, to the extent that only those alkali metal which cannot be removed by ion exchange techniques are present. The preferred lithium polysilicate contains about 20–25% by weight of silica as $SiO_2$ and has an $SiO_2/Li_2O$ ratio of about 4–10/1. Especially preferred polysilicate contains about 20–25% by weight of silica as $SiO_2$ and has an $SiO_2/Li_2O$ molar ratio of 4–5.5/1. An even more preferred lithium polysilicate contains 20–25% by weight, of silica as $SiO_2$ and has an $SiO_2/Li_2O$ molar ratio of 8–9/1.

The lithium polysilicate is ordinarily present in a primer composition at a concentration of about 10–75% by weight, based on the total weight of the polysilicate and polytetrafluoroethylene polymer solids, preferably about 15–40% by weight is used and an especially preferred composition contains 25% by weight lithium polysilicate.

The polytetrafluoroethylene polymers present in the primer composition in about 25–90% by weight, based on the total weight of the polysilicate and fluorocarbon polymer, preferably about 60–85% by weight is used. One particularly preferred primer composition contains about 75% by weight of the polytetrafluoroethylene polymer.

The primer composition can be non-pigmented or pigmented. The composition can be applied by conventional techniques as stated above.

Another primer composition can be utilized as shown in Osdal U.S. Pats 2,562,117 and 2,562,118, both issued July 24, 1951. These compositions contain polytetrafluoroethylene and chromic acid or a blend of chromic acid and phosphoric acid. This primer composition can be applied over a roughened metal substrate or a metal substrate having a glass frit layer thereon and then the primer is dried and the novel coating composition of this invention is applied.

The novel coating composition of this invention is applied by the aforementioned standard techniques and then baked at 0.5–45 minutes at 250–400° C. to form a topcoat layer of about 0.2–5 mils thick. Preferably, a layer of about 0.5–1.5 mils is formed.

The novel coating composition of this invention forms excellent finishes on ice cube trays, dough cutters, paper cutters, and can be used as a lubricant coating on bearings and curtain rods and can be used as a coating on coin machine slots, fan vents, shovels and discardible aluminum utensils.

The following examples illustrate the invention. All quantities are on a weight basis unless otherwise indicated.

EXAMPLE 1

A mill base was prepared as follows:

Parts by weight

Silicone resin solution (61% solids in toluene of a structured polysiloxane resin [1]

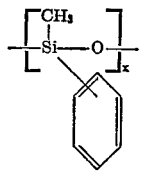

in which the solution has a viscosity 43 centistokes at 25° C. and a gel time at 250° C. of all 11 minutes and the resin has a refractive index of 1.5220, has a specific gravity of 1.08 and has a weight loss at 250° C. (100 hours) of 5.2%) _____ 240
Zirconium silicate (0.2–0.5 micron particles) _____ 400
Carbon black pellets _____ 40
Ethylene glycol monoethyl ether _____ 220

Total _____ 900

[1] Formula.

The above ingredients were blended together and charged into a pebble mill and ground for 12 hours to a fineness of less than 0.5 mils.

A coating composition was then prepared by blending the following ingredients:

| | Parts by weight |
|---|---|
| Mill base (prepared above) | 225.00 |
| Silicone resin solution (described above) | 104.00 |
| Silicone fluid (Dow 200-polydimethyl siloxane having a viscosity at 25° C. of 200 centistokes) | 1.64 |
| Total | 330.64 |

The resulting coating composition had a zirconium silicate to binder ratio of 100/100.

An aluminum fry pan and a sheet of aluminum were wiped with acetone to remove any residual grease and then grit blasted. The pan and the sheet were then cleaned of grit particles with a blast of compressed air. The above coating composition was then sprayed onto the fry pan and the aluminum sheet and air dried for about 15 minutes and then baked for 30 minutes at 268° C. The resulting finish on the fry pan and on the aluminum sheet had a good appearance, excellent adhesion to the metal substrate, a pencil hardness of HB and excellent water bead tracking.

The fry pan was subjected to the following tests:

One hour boiling water.
One hour boiling 10% "Cascade" detergent in water.
One hour boiling cotton seed oil.

After each test, the finish on the fry pan was tested for softening. No softening of the finish was noted.

The fry pan was subjected to home use for one week. Eggs were fried without grease and the pan cleaned easily. Bacon, sausage, pan cakes were cooked in the pan and no sticking of the food to the finish was noted and the finish did not soften. During the one week use, the pan was subjected to detergents, hot water, steel wool and abrasive cleaners but no loss in release properties of the finish was noted.

Example 2

In accordance with the invention, the following coating composition can be prepared and it is expected that the coated articles prepared with this composition would have characteristics very similar to the articles prepared in Example 1.

A mill base can be prepared as follows:

| | Parts by weight |
|---|---|
| Iron oxide yellow pigment | 200 |
| Zirconium silicate (described in Example 1) | 400 |
| Silicone resin solution (described in Example 1) | 200 |
| Ethylene glycol monobutyl ether | 200 |
| Total | 1000 |

The above ingredients are blended together and charged into a pebble mill and ground for about 12 hours to less than 0.5 mil fineness.

A coating composition can be prepared by blending the following ingredients:

| | Parts by weight |
|---|---|
| Mill base (prepared above) | 325.0 |
| Silicone resin solution (described in Example 1) | 183.0 |
| Silicone fluid (described in Example 1) | 10.0 |
| Total | 518.0 |

The resulting coating composition has a solids content of about 60%, a zirconium silicate to binder ratio of 130/100 and an iron yellow pigment to binder ratio of 20/100.

The above coating can be applied to a grit blasted fry pan and baked as in Example 1. The resulting finish should have the same desirable characteristics as in Example 1.

A primer composition can be prepared as follows:

| | Parts by weight |
|---|---|
| Polytetrafluoroethylene dispersion (36% polymer solids in which the polymer particle size is about 0.2 microns average diameter) | 375 |
| Lithium polysilicate | 375 |
| Pigment dispersion (described hereinafter) | 30 |
| Total | 780 |

The above ingredients are blended thoroughly to form a primer composition.

The pigment dispersion used in the above primer composition can be prepared as follows:

| | Parts by weight |
|---|---|
| Water | 69.4 |
| Sodium polynaphthylene sulfonate | 0.5 |
| Iron oxide pigment | 5.3 |
| Carbon black pigment | 0.7 |
| Total | 75.9 |

The above ingredients are mixed together and charged into a conventional ball mill and milled for 16 hours.

The above primer composition can be sprayed onto a grit blasted fry pan and then air dried to form a primer film about 0.2–0.4 mils thick. The above coating composition can be sprayed onto the fry pan and air dried for about 15 minutes and baked for 15 minutes at about 345° C. to form a finish on the fry pan that is expected to have the same desirable characteristics as in Example 1.

Another fry pan can be prepared by spraying a thin layer of glass frit on a grit blasted aluminum fry pan and then baking the pan at about 530° C. for 1 minute. The above prepared primer composition and above coating composition can then be applied using the same procedure. The resulting finish on the fry pan should have the same desirable characteristics as in Example 1.

Example 3

In accordance with this invention, the following coating composition can be prepared and it is expected that the coated articles prepared with this composition would have characteristics very similar to the articles prepared in Example 1.

A mill base can be prepared as follows:

| | Parts by weight |
|---|---|
| Pigmentary fibrous potassium titanate (0.2 micron in diameter 6–19 microns in length) | 10 |
| Iron oxide yellow | 15 |
| Zirconium silicate (described in Example 1) | 35 |
| Silicone resin solution (described in Example 1) | 20 |
| Butyl carbitol | 20 |
| Total | 100 |

The above ingredients are blended together and charged into a pebble mill and ground for about 12 hours.

A coating composition can be prepared by blending the following ingredients:

| | Parts by weight |
|---|---|
| Mill base (prepared above) | 142 |
| Silicone resin solution (described in Example 1) | 130 |
| Silicone fluid (described in Example 1) | 5 |
| Total | 277 |

The resulting coating composition has a zirconium silicate to binder ratio of about 50/100, an iron oxide/binder ratio of about 21.5/100 and a fibrous potassium titanate to pigment ratio of 14.2/100.

The above coating composition when sprayed onto a grit blasted aluminum fry pan and baked as in Example 1 should provide a finish having similar characteristics to the finish of Example 1 and should show improved abrasion resistance.

Example 4

A coating composition can be prepared by blending together the following ingredients:

| | Parts by weight |
|---|---|
| Coating composition of Example 1 | 100 |
| Aluminum flake (325 mesh) | 10 |
| Total | 110 |

The above coating composition when sprayed onto a grit blasted aluminum fry pan and baked following the procedure of Example 1 should provide a finish on the fry pan with characteristics similar to the coated fry pan of Example 1.

The invention claimed is:

1. A coating composition having an inert organic liquid carrier and a solids content of 25–80% by weight and comprises a binder consisting essentially of
   (1) 0.5 to 20% by weight, based on the weight of the binder, of a dimethyl polysiloxane fluid having a viscosity of 50–1000 centistokes measured at 25° C.; and correspondingly
   (2) 99.5 to 80% by weight, based on the weight of the binder, of a heat curable structured polysiloxane resin having the repeating structural formula

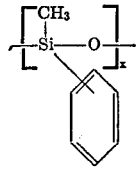

wherein $x$ is a positive integer sufficiently large to provide a viscosity of 10–80 centistokes measured at 60% resin solids in toluene at 25° C. and the resin has a refractive index of 1.45–1.57 and a specific gravity of about 1.05–1.5; and
   a finely divided inert inorganic hardening agent of zirconium silicate in a hardening agent to binder ratio of about 25/100 to 400/100.

2. The coating composition of claim 1 in which the binder consists essentially of
   (1) 5–15% by weight of dimethyl polysiloxane fluid having a viscosity of 50–1000 centistokes measured at 25° C.; and correspondingly,
   (2) 95–85% by weight of the structured polysiloxane resin having a viscosity of 20–60 centistokes measured at 60% polymer solids in toluene at 25° C.

3. The coating composition of claim 2 containing zirconium silicate as the inert inorganic hardening agent in a hardening agent to binder ratio of about 100/100 to about 150/100.

4. The coating composition of claim 1 containing heat stable pigments and filler pigments in a pigment to binder ratio of 5/100 to 100/100.

5. The coating composition of claim 2 containing reinforcing pigments selected from the group consisting of aluminum flake, potassium titanate fibrils, titanium dioxide fibrils, silicon dioxide fibrils, alumina monohydrate fibrils and mixtures thereof in a pigment to binder ratio of about 5/100 to 20/100.

6. The coating composition of claim 5 in which the reinforcing pigment is aluminum flake.

7. The coating composition of claim 5 in which the reinforcing pigment is potassium titanate fibrils.

References Cited

UNITED STATES PATENTS

| | | | |
|---|---|---|---|
| 3,308,079 | 3/1967 | Haenni | 260—33.65 B |
| 3,308,080 | 3/1967 | Haenni | 260—33.65 B |
| 2,672,105 | 3/1954 | Clark | 106—287 SB |
| 3,002,946 | 10/1961 | Thomas | 117—132 BS |
| 3,078,006 | 2/1963 | Price et al. | 117—75 |
| 3,196,027 | 7/1965 | White et al. | 106—287 SB |
| 3,300,542 | 1/1967 | Hadlock | 117—132 BS |
| 3,615,826 | 10/1971 | Brill et al. | 106—287 SB |

ALLAN LIEBERMAN, Primary Examiner

U.S. Cl. X.R.

106—287 SB; 117—75, 132 BS; 260—33.25 B, 33.6 SB, 37 SB